United States Patent
Perdomi et al.

(10) Patent No.: US 9,035,007 B2
(45) Date of Patent: May 19, 2015

(54) POLYOLEFIN STRAP COMPRISING A RANDOM COPOLYMER OF PROPYLENE WITH 1-HEXENE

(75) Inventors: Gianni Perdomi, Ferrara (IT); Monica Galvan, Ferrara (IT); Renaud Lemaire, Ferrara (IT); Roberta Marzolla, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/232,574

(22) PCT Filed: Jul. 13, 2012

(86) PCT No.: PCT/EP2012/063750
§ 371 (c)(1),
(2), (4) Date: Jan. 13, 2014

(87) PCT Pub. No.: WO2013/010927
PCT Pub. Date: Jan. 24, 2013

(65) Prior Publication Data
US 2014/0171610 A1    Jun. 19, 2014

Related U.S. Application Data

(60) Provisional application No. 61/508,830, filed on Jul. 18, 2011.

(30) Foreign Application Priority Data

Jul. 15, 2011    (EP) .................................... 11174086

(51) Int. Cl.
| | | |
|---|---|---|
| *C08F 210/06* | (2006.01) | |
| *C08F 210/14* | (2006.01) | |
| *B29C 55/00* | (2006.01) | |
| *B29C 55/06* | (2006.01) | |
| *C08J 5/18* | (2006.01) | |
| *B29K 23/00* | (2006.01) | |

(52) U.S. Cl.
CPC ........... *C08F 210/14* (2013.01); *B29K 2023/14* (2013.01); *B29C 55/005* (2013.01); *B29C 55/06* (2013.01); *C08F 210/06* (2013.01); *C08J 5/18* (2013.01); *C08L 2314/02* (2013.01)

(58) Field of Classification Search
CPC ..................................................... C08F 210/06
USPC ..................................... 526/348.5, 348, 351
See application file for complete search history.

(56) References Cited

U.S. PATENT DOCUMENTS

| | | | | |
|---|---|---|---|---|
| 3,066,366 | A * | 12/1962 | Oneal, Jr. et al. | ............ 24/16 PB |
| 3,324,217 | A * | 6/1967 | Armstrong et al. | ......... 264/210.2 |
| 3,639,530 | A * | 2/1972 | Ryan | ............................ 525/221 |
| 4,451,524 | A * | 5/1984 | Matsumoto | ................... 428/212 |
| 4,461,872 | A * | 7/1984 | Su | ................................. 525/240 |
| 4,503,007 | A * | 3/1985 | Matsumoto | ................ 264/210.7 |
| 7,674,731 | B2 * | 3/2010 | Marzolla et al. | ............. 442/365 |
| 8,017,206 | B2 * | 9/2011 | De Palo et al. | ............. 428/36.92 |
| 2003/0144448 | A1 | 7/2003 | Ebara et al. | |

FOREIGN PATENT DOCUMENTS

| | | | | |
|---|---|---|---|---|
| JP | 55-87533 A | * | 7/1980 | ............ B29D 29/00 |
| WO | WO2005/059210 A1 | | 10/2004 | |
| WO | WO 2010/057840 A1 | * | 5/2010 | ............ C08F 210/06 |
| WO | WO2011/061067 A1 | | 5/2011 | |

OTHER PUBLICATIONS

PCT International Search Report & Written Opinion mailed Sep. 25, 2012, for PCT/EP2012/063750.

* cited by examiner

*Primary Examiner* — Rip A Lee

(57) ABSTRACT

A strap comprising a propylene and 1-hexene copolymer containing from 0.3 wt % to less than 5 wt % of 1-hexene derived units said copolymer having a melt flow rate (MFR) determined according to ISO method 1133 (230° C., 2.16 kg ranging from 0.3 to less than 11 g/10 min.

6 Claims, No Drawings

POLYOLEFIN STRAP COMPRISING A RANDOM COPOLYMER OF PROPYLENE WITH 1-HEXENE

This application is the U.S. National Phase of PCT International Application PCT/EP2012/063750, filed Jul. 13, 2012, claiming priority of European Patent Application No. 11174086.6, filed Jul. 15, 2011, and the benefit under 35 U.S.C. 119(e) of U.S. Provisional Application No. 61/508,830 filed Jul. 18, 2011, the contents of which are incorporated herein by reference in their entirety.

FIELD OF THE INVENTION

The present invention relates to strap comprising random copolymers of propylene with 1-hexene.

BACKGROUND OF THE INVENTION

Steel and plastic strapping are used for a wide variety of applications, often to secure very large coils of steel, synthetic fiber bales and heavy palletized boxes. Steel strapping has advantages in that it has high strength and temperature resistance and outstanding creep resistance. Steel strapping is typically used on heavy loads where high strap strengths and low creep properties are required. However, steel strapping, although very useful in maintaining the quality of the packaging, may be more difficult to dispose of and the strap can have sharp edges.

Plastic strap has found particular application to lower strength packaging requirements and represents a less expensive alternative to steel strap. Plastic strap typically has an elastic behavior within limits which allows the strap to remain tight on a package even if the package collapses or somewhat consolidates. The plastic strap is easily disposed of and is safer to use than steel strap because it does not have the dangerous sharp edges of steel strap.

Polypropylene has been proposed as material to be used in plastic strap in EP 115917. However this document describes a generic polypropylene homopolymer.

SUMMARY OF THE INVENTION

The applicant has now surprisingly found that straps having high values of specific tenacity (g force/denier) and very low value of creep tenacity can be obtained by using a propylene/1-hexene copolymer.

DETAILED DESCRIPTION OF THE INVENTION

Thus an object of the present invention is a strap comprising a propylene/1-hexene copolymer containing from 0.2 wt % to less than 5.0 wt %, preferably from 0.5 wt % to less than 3.0 wt %, more preferably from 0.8 wt % to 2.4 wt % of 1-hexene derived units; said copolymer having a melt flow rate (MFR) determined according to ISO method 1133 (230° C., 2.16 kg ranging from 0.3 gr/10 min to less than 11 g/10 min; preferably from 0.5 g/10 min to 8 dl/10 min; more preferably from 0.8 g/10 min to 5 g/10 min.

Preferably the melting point of the propylene/1-hexene copolymer is higher than 145° C. preferably comprised between 146° C. and 159° C.

The strap of the present invention have high tensile strength. The tensile strength is related to the stretching (draw) ratio, (that is, to the rate of orientation of the molecular chains in the straps) of the material.

In order for the strap to have an adequate tensile strength, usually the draw ratio is limited to around 10 when the draw ratio of the material is increased to over 10, the tensile strength of the resulting strap is put in a plateau-like state in which the tensile strength is decreased, or a so-called "strain hardening" occurs in the strap. As a result, the elastic recovery of the strap is decreased to a great extent and the strap cannot be used practically. However by using the propylene/1hexene copolymer of the present invention the draw ratio can be further increased, up to 1:13 with an increasing of the tensile strength.

Thus a further object of the present invention is a strap as described above having a stretching ratio comprised between 1:8 to 1:15; preferably ratio comprised between 1:11 to 1:14

The strap of the present invention can be obtained with techniques commonly known in the art such as that one described in Ep 115 917 or Ep 711 649.

The copolymers of the invention have stereoregularity of isotactic type, this is shown by the low xylene soluble content at 25° C. that is lower than 5 wt % preferably lower than 4 wt %, more preferably lower than 3 wt %.

According to the present invention the term "copolymer" includes only propylene and 1-hexene.

Typically, said copolymers exhibit a solubility in xylene at 25° C. below 5 wt %, preferably below 4 wt %, more preferably below 3 wt %.

Typically, the copolymers of the invention have a polydispersity index, determined with the rheological method described in the characterization section below, from 3 to 7, more preferably from 3.5 to 5.

The propylene-hexene-1 polymers used in the present invention can be prepared by polymerisation in one or more polymerisation steps. Such polymerisation is preferably carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing propylene polymers with a value of xylene insolubility at 25° C. greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are 1,3-diethers of formula:

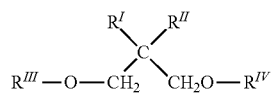

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl) fluorene.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2.nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are $(tert-butyl)_2Si(OCH_3)_2$, $(cyclohexyl)(methyl)Si(OCH_3)_2$, $(cyclopentyl)_2SKOCH_3)_2$, $(phenyl)_2Si(OCH_3)_2$ and $(1,1,2-trimethylpropyl)Si(OCH_3)_3$, which is preferred.

1,3-diethers having the formulae described above can also be used advantageously. If the internal donor is one of these diethers, the external donors can be omitted.

In particular, even if many other combinations of the previously said catalyst components may allow to obtain propylene polymer compositions according to the present invention, the random copolymers of propylene and 1-hexene are preferably prepared by using catalysts containing a phthalate as inside donor and $(cyclopentyl)_2SKOCH_3)_2$ as outside donor, or the said 1,3-diethers as inside donors.

The said propylene-hexene-1 copolymers are typically produced by well-known polymerisation processes. According to a preferred embodiment, the polymerisation process is carried out in one or more stage(s). In case the two or more stages of polymerisation are carried out, the copolymers are prepared in sequential stages. In each stage the operation takes place in the presence of the copolymer obtained and the catalyst in the preceding stage.

According to another polymerisation process the copolymers are produced by a polymerisation process carried out in at least two interconnected polymerisation zones.

The process according to the preferred process is illustrated in EP application 782 587.

In detail, the said process comprises feeding the monomers to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the copolymers and the gaseous mixture leaving the riser are conveyed to a solid/gas separation zone. The solid/gas separation can be effected by using conventional separation means. From the separation zone, the copolymers enter the downcomer. The gaseous mixture leaving the separation zone is compressed, cooled and transferred, if appropriate with the addition of make-up monomers and/or molecular weight regulators, to the riser. The transfer can be done by means of a recycle line for the gaseous mixture.

The control of the copolymer circulating between the two polymerisation zones can be done by metering the amount of polymer leaving the downcomer using means suitable for controlling the flow of solids, such as mechanical valves.

The operating parameters, such as the temperature, are those that are usual in gas-phase olefin polymerisation process, for example between 50 to 120° C.

This first stage process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The copolymers and polyolefin compositions of the invention may further comprise additives commonly employed in the polyolefin field, such as antioxidants, light stabilizers, nucleating agents, antiacids, colorants, fillers and processing improvers, said additives being normally added to the random copolymer (A) and/or polyolefin (B) and/or composition (C) according to methods well known in the art.

The following examples are given to illustrate the present invention without limiting purpose.

EXAMPLES

The data relating to the polymeric materials and the fibres of the examples are determined by way of the methods reported below:

Melting Temperature:
Determined by differential scanning calorimetry (DSC). A sample weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, temperatures corresponding to peaks are read.

Melt Flow Rate:
Determined according to ISO method 1133 (230° C., 2.16 kg).

Solubility in Xylene at 25° C.:
Determined as follows: 2.5 g of polymer and 250 ml of xylene are introduced in a glass flask equipped with a refrigerator and a magnetical stirrer. The temperature is raised in 30 minutes up to the boiling pint of the solvent. The so obtained clear solution is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

1-Hexene Content:
Determined by $^{13}$C-NMR spectroscopy in copolymers. $^{13}$C NMR spectra are acquired on an AV-600 spectrometer operating at 150.91 MHz in the Fourier transform mode at 120° C. The peak of the propylene CH was used as internal reference at 28.83. The $^{13}$C NMR spectrum is acquired using the following parameters:

| | |
|---|---|
| Spectral width (SW) | 60 ppm |
| Spectrum centre (O1) | 30 ppm |
| Decoupling sequence | WALTZ 65_64pl |
| Pulse program[1] | ZGPG |
| Pulse Length (P1)[2] | for 90° |
| Total number of points (TD) | 32K |
| Relaxation Delay[2] | 15 s |
| Number of transients[3] | 1500 |

The total amount of 1-hexene as molar percent is calculated from the diads using the following relations:

$[P] = PP + 0.5PH + 0.5PE$ $[H] = HH + 0.5PH$ $[E] = EE + 0.5PE$

Assignments of the $^{13}$C NMR spectrum of propylene/1-hexene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Polydispsersity Index (PI):
Determined according to ISO 6721-10 method. PI is calculated by way of a dynamic test carried out with a RMS-800 rheometric mechanical spectrometer. The PI is defined by the equation $PI = 10^5/Gc,$ where the Gc (crossover modulus) value is the one where G' (storage modulus) coincides with G" (loss modulus). A sample is prepared with one gram of polymer, said sample having a thickness of 3 mm and a diameter of 25 mm; it is then placed in the above mentioned apparatus and the temperature is then gradually increased until it reaches a temperature of 200 C after 90 minutes. At this temperature one carries out the test where G' and G" are measured in function of the frequency.

Titre of Fibres:
from a 10 cm long roving, 50 fibres are randomly chosen and weighed. The total weight of the said 50 fibres, expressed in mg, is multiplied by 2, thereby obtaining the titre in dtex.

Tenacity and Elongation at Break
Measured on strap according to ASTM D882-02, using a dynamometer INSTRON 4301, under the following conditions:
test temperature of 23° C.; cross head speed of 500 mm/min., independently of the specimen elongation at break; distance between clamps of 500 mm.

Creep Performance Test

Measured on the strap according ASTM D5459-95 procedure but with following modified conditions:
test temperature 23° C.
Elongation speed: 50 mm/min;
Clamp distance 50 mm;
Time wait at max elongation: 0 seconds;
Time wait after crosshead return: 15 minutes
Strap Titre 3 pieces of exactly 1 m long strap are weighted. Average of 3 weighted results is then multiplied by 9000.

Titre is expressed as "denier" (weight in grams of 9000 m of textile item or strap).

Example 1

Preparation of the Solid Catalyst Component

Into a 500 mL four-necked round flask, purged with nitrogen, 250 mL of $TiCl_4$ are introduced at 0° C. While stirring, 10.0 g of microspheroidal $MgCl_2 \cdot 2.8C_2H_5OH$ (prepared according to the method described in example 2 of U.S. Pat. No. 4,399,054 but operating at 3000 rpm instead of 10000 rpm), 9.1 mmol diisobutylphthalate as internal electron-donor compound is added. The temperature is raised to 100° C. and maintained for 120 min. Then, the stirring is discontinued, the solid product is allowed to settle and the supernatant liquid is siphoned off. Then 250 ml of fresh $TiCl_4$ are added. The mixture is reacted at 120° C. for 60 min and, then, the supernatant liquid is siphoned off. The solid is washed six times with anhydrous hexane (6×100 ml) at 60° C.

The solid catalyst component is used with dicyclopentyldimethoxysilane (DCPMS) as external-donor component and triethylaluminium.

Polymerization

Copolymers are prepared by polymerising propylene and hexene-1 in the presence of the above catalyst under continuous conditions in a plant comprising a gas-phase polymerisation apparatus. The apparatus comprises two interconnected cylindrical reactors (riser and downcomer). Fast fluidisation conditions are established in the riser by recycling gas from the gas-solid separator.

The hydrogen concentration is kept at the same concentration in both riser and downcomer and the hexene-1 is fed only into the downcomer.

The polymer particles exiting the reactor are subjected to a steam treatment to remove the reactive monomers and volatile substances and then dried.

Other operative conditions and the properties of the produced copolymers are indicated in Table 1.

TABLE 1

| Examples | 1 |
|---|---|
| Polymerisation conditions | |
| Temperature, ° C. | 75 |
| Pressure, barg | 27 |
| $H_2/C_3^-$, mol/mol | 0.037 |
| $C_6^-/(C_6^- + C_3^-)$, mol/mol | 0.01 |
| Properties of the copolymers | |
| Hexene-1 Content, wt % | 0.8 |
| Melt Flow Rate, g/10 min (MFR1) | 3.2 |
| Melting Temperature, ° C. | 151.3 |
| Xylene-Soluble Content, wt % | 2.3 |

$C_3^-$ propylene
$C_6^-$ 1-hexene

Comparative Examples 2 and 3

Comparative example 2 is a commercial polypropylene homopolymer sold by Lyondellbasell under the tradename Moplen HP556E. Comparative example 3 is a commercial polypropylene homopolymer sold by Lyondellbasell under the tradename Moplen HP456H. Both resins are sold to be used for producing straps. The features of the resins of comparative examples 2 and 3 and example 1 have been summarized in table 2.

TABLE 2

| ex | | E4380-1<br>1 | HP556E<br>2* | HP456H<br>3* |
|---|---|---|---|---|
| Melting point | ° C. | 154 | 160 | 160 |
| MFR | | 1.2 | 0.7 | 1.8 |

*comparative

Straps were produced by using a extrusion line based on 90 mm extruder, gear pump, screen, static mixer, head with 4 tapes dies, quenching water bath, dryer, slow speed rolls, 4 m stretching oven with triple passages, high speed godet, embossing unit, 4 m annealing oven+5 m cooling water bath and dewatering, annealing speed godet and winding units. Straps with nominal sizes of 12 mm wide×0.8 mm thick have been produced at stretching ratio 1:9 and 1:13.

The obtained straps have been tested. The results are reported on table 3

TABLE 3

| examples | | E4380-1 | | HP556E | | HP456H | |
|---|---|---|---|---|---|---|---|
| | | 1 | 1' | 2* | 2'* | 3* | 3'* |
| Stretching ratio | | 1:9 | 1:13 | 1:9 | 1:13 | 1:9 | 1:13 |
| titre | dernier | 56500 | 58000 | 55500 | 60000 | 57000 | 57000 |
| Elongation at break | % | 20 | 16 | 16 | 16 | 15 | 8 |
| tenacity | Kg | 295 | 369 | 286 | 345 | 216 | 240 |
| Specific tenacity | g/dernier | 5.2 | 6.4 | 5.2 | 5.8 | 4.2 | 3.8 |
| creep performance - residual deformation after 1st hysteresis cycle + 15 min | % | 5.6 | nt | 8.4 | nt | 10.0 | nt |
| creep performance - residual deformation after 2nd hysteresis cycle + 15 min | % | 7.3 | nt | 10.0 | nt | 11.7 | nt |

*comparative
nt = not tested

From table 3 clearly results that the propylene/1-hexene when used in the production of straps produces material having improved performance in tenacity, specific tenacity and creep resistance even at high stretching ratio.

What is claimed is:

1. A strap comprising a propylene and 1-hexene copolymer containing from 0.25 wt. % to less than 5 wt. % of 1-hexene derived units,
    wherein the copolymer has a melt flow rate (MFR) determined according to ISO method 1133 (230° C., 2.16 kg) ranging from 0.3 to less than 11 g/10 min, and
    wherein the strap has a stretching ratio between 1:8 to 1:15.

2. The strap according to claim 1, wherein the propylene and 1-hexene copolymer contains from 0.5 wt. % to less than 3 wt. % of 1-hexene derived units.

3. The strap according to claim 2, wherein the propylene and 1-hexene copolymer contains from 0.8 wt. % to 2.4 wt. % of 1-hexene derived units.

4. The strap according to claim 1, wherein the propylene and 1-hexene copolymer has a melt flow rate (MFR2) determined according to ISO method 1133 (230° C., 2.16 kg) ranging from 0.5 dl/10 min to 8 dl/10.

5. The strap according to claim 1, wherein the propylene and 1-hexene copolymer has a melting point higher than 145° C.

6. The strap according to claim 1, wherein the strap has stretching ratio between 1:11 to 1:14.

* * * * *